United States Patent [19]
Pietzsch

[11] Patent Number: 5,673,963
[45] Date of Patent: Oct. 7, 1997

[54] CAB FOR ACCOMODATING THE OPERATOR OF A VEHICLE OR MACHINE

[75] Inventor: Ludwig Pietzsch, Karlsruhe, Germany

[73] Assignee: Pietzsch Automatisierungstechnik GmbH, Ettlingen, Germany

[21] Appl. No.: 331,139

[22] Filed: Jan. 23, 1995

Related U.S. Application Data

[63] Continuation-in-part of Ser. No. 210,308, Mar. 17, 1994, Pat. No. 5,367,004.

[30] Foreign Application Priority Data

Mar. 18, 1993 [DE] Germany .......................... 43 08 556.3
Jun. 7, 1994 [DE] Germany .......................... 44 19 836.1

[51] Int. Cl.$^6$ .......................... B62D 23/00; B60K 37/06
[52] U.S. Cl. .......................... 296/190; 180/89.12; 296/70
[58] Field of Search .................. 296/190, 70; 180/89.12, 180/90

[56] References Cited

U.S. PATENT DOCUMENTS 4,097,085 6/1978 Nelson ........................ 296/190
4,436,177 3/1984 Elliston ........................ 296/190 X
5,150,942 9/1992 Fujan et al. ........................ 296/190

FOREIGN PATENT DOCUMENTS 1527036 12/1989 U.S.S.R. ........................ 296/21
979261 12/1992 U.S.S.R. ........................ 296/190

Primary Examiner—Joseph D. Pape
Attorney, Agent, or Firm—Max Fogiel

[57] ABSTRACT

A cab for accommodating the operator of a vehicle or machine, especially a traveling crane or other type of construction machinery. It comprises a seat for the operator, an operating-information display system with a monitor and display instruments in the seated operator's field of vision, and at least one optionally multiple-function operations-control device directly within his reach. The information-display system consists of a monitor with a liquid-crystal display and of a projection screen remote therefrom. The screen pivots around one axis and tilts around another axis at an angle thereto within the operator's field of vision. A source of light behind the monitor projects the displayed information onto the screen.

11 Claims, 4 Drawing Sheets

FIG.1
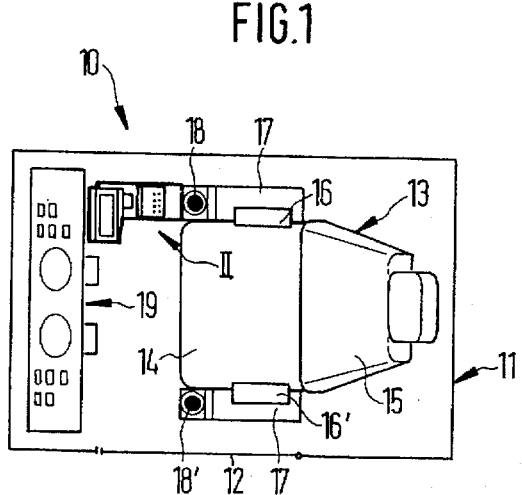
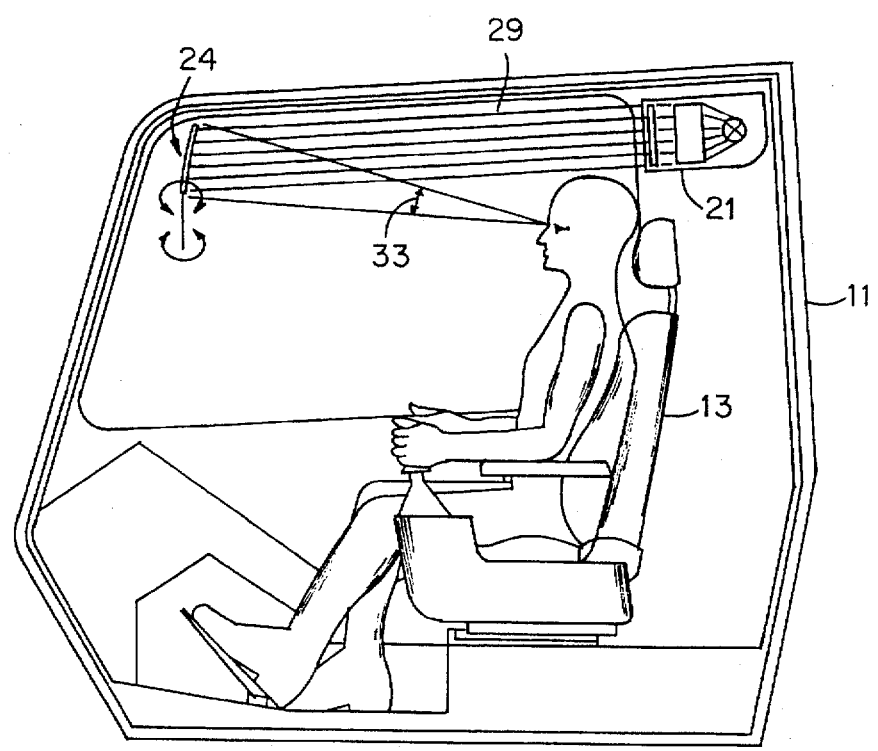
FIG. 2

CAB FOR ACCOMODATING THE OPERATOR OF A VEHICLE OR MACHINE

The present application is a continuation-in-part of the parent application Ser. No. 210,308 filed Mar. 17, 1994, U.S. Pat. No. 5,567,004.

BACKGROUND OF THE INVENTION

The parent (the application) concerns a cab for accommodating the operator of a vehicle or machine, especially a traveling crane or other type of construction machinery. It comprises a seat for the operator, an operating-information display system with a monitor and display instruments in the seated operator's field of vision, and at least one optionally multiple-function operations-control device directly within his reach. To minimize glare, which derives mostly from the sun, the monitor pivots around one axis and tilts around another axis at an angle thereto within the operator's field of vision and reach.

Although this operator's cab has been proven practical, the present invention represents an improvement. The information-display system now consists of a monitor with a liquid-crystal display and of a projection screen remote therefrom that pivots around one axis and tilts around another axis at an angle thereto within the operator's field of vision. A source of light behind the monitor projects the displayed information onto the screen.

In the parent patent the monitor itself pivots around one axis and tilts around another axis at an angle thereto within the field of vision and reach of an operator seated in the cab. The operator can accordingly directly adjust the position of the monitor manually to eliminate as much glare as possible.

SUMMARY OF THE INVENTION

In the present invention on the other hand it is a screen remote from the monitor that pivots around one axis and tilts around another in the operator's field of vision such that its position can be adjusted to eliminate as much glare as possible, and the monitor includes a rear-illuminated liquid-crystal display of information that is projected onto the screen. Separating the screen allows it to be positioned not only in the operator's field of vision but also directly within his line of sight, so that he can read any information displayed on the monitor without essentially moving his eyes or turning his head.

Another improvement is attained in another embodiment of the invention in that the remote screen that the source of light projects the information onto is at least semitransparent and its position can accordingly be positioned within the operator's line of sight such that he can observe the field of operation through it. Glare can be minimized if the at least semitransparent screen is antiglare.

It is particularly practical for the transparency of the screen to be variable. The variability can be automatic in accordance with the incident sunlight for example as in the case of sunglasses with lenses that darken in response to intense light. The variability can alternatively be attained with a manually or mechanically handled filter. The information from the monitor's liquid-crystal display can be projected onto the remote screen with parallel beams. This approach prevents distortion.

The pivoting and tilting screen can in accordance with the present invention be positioned directly in the path of the beams emitted by the source of light and traveling through the liquid-crystal display. The displayed information can, however, alternatively be projected onto the screen by way of at least one mirror positioned at an angle to the beams.

It can, finally, also be practical in order to simplify operation to adjust the position of the screen with two mechanisms, one to pivot it around the first axis and the other to tilt it around the second axis.

One embodiment of the invention in the form of a cab for accommodating the operator of a crane and with an operating-information display system and an operations-control device will now be specified with reference to the accompanying schematic drawing, wherein

BRIEF DESCRIPTION OF THE DRAWINGS

FIG. 1 is a plan of the cab with its display system and control device,

FIG. 2 is a vertical section through the cab illustrated in FIG. 1 illustrating the positions of the rear-illuminated liquid-crystal display monitor and the semitransparent screen at the top of the cab's windshield.

DESCRIPTION OF THE PREFERRED EMBODIMENTS

Figure 3:
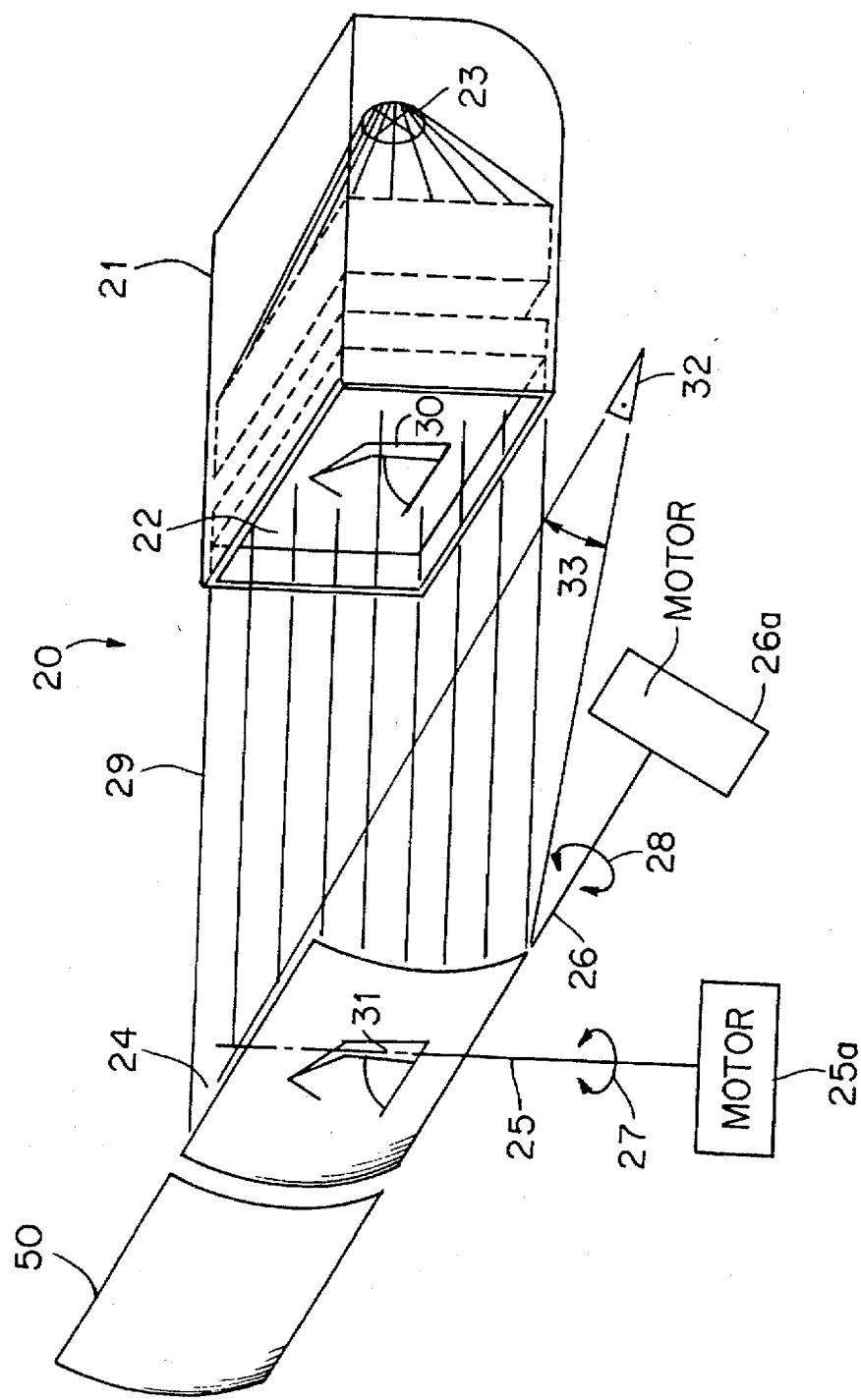
FIG. 3 is a schematic perspective view of the rear-illuminated liquid-crystal display monitor and remote screen.

FIGS. 1 and 2 illustrate an entire cab 10 for accommodating the operator of an otherwise unillustrated traveling crane. Cab 10 is accommodated in a body 11 that has windows essentially all around it and a door 12. It includes an operator's seat 13 with a cushion 14, a back 15, and arms 17 and 17'.

On each side of cushion 14 and below arms 17 and 17' is a console. Mounted on the side of each console remote from seat back 15 is a multiple-function control device in the form of a joystick 18 and 18'.

Cab 10 also includes a dashboard 19 with instruments, of no particular interest in the present context, in the field of vision of an operator sitting in the seat.

The cab finally includes an information-display system 20 consisting of a monitor 21 with a rear-illuminated liquid-crystal display 22 and a projection screen 24 remote therefrom. Monitor 21 is behind and above operator's seat 13 and projection screen 24 is in the vicinity of the roof and at the cab's windshield. The monitor's liquid-crystal display faces screen 24. As illustrated in FIG. 3, the screen pivots around a vertical axis 25 in the direction indicated by double arrow 27 and tilts around a horizontal axis 26 in the direction indicated by double-headed arrow 28.

The liquid-crystal display 22 on monitor 21 is illuminated from the rear by the source 23 of light schematically illustrated in FIG. 3. Displayed information is projected undistorted in parallel beams 29 onto pivoting and tilting screen 24. The information is in the form of an image 30 on display 22 and in the form of a projection 31 on screen 24. Screen 24 is in the operator's field of vision and, since it is at least semitransparent, the operator will be able to see part of the field of operation through it.

The operator's eye 32 is illustrated in FIG. 3 and his field of vision represented by angle 33.

The ability of screen 24 to pivot and tilt allows its position to be adjusted to eliminate glare in almost any conceivable situation. Each axis 25 and 26 is associated with a motor 25a and 26a, that controls the pivoting and tilting motion, respectively.

Figure 5:
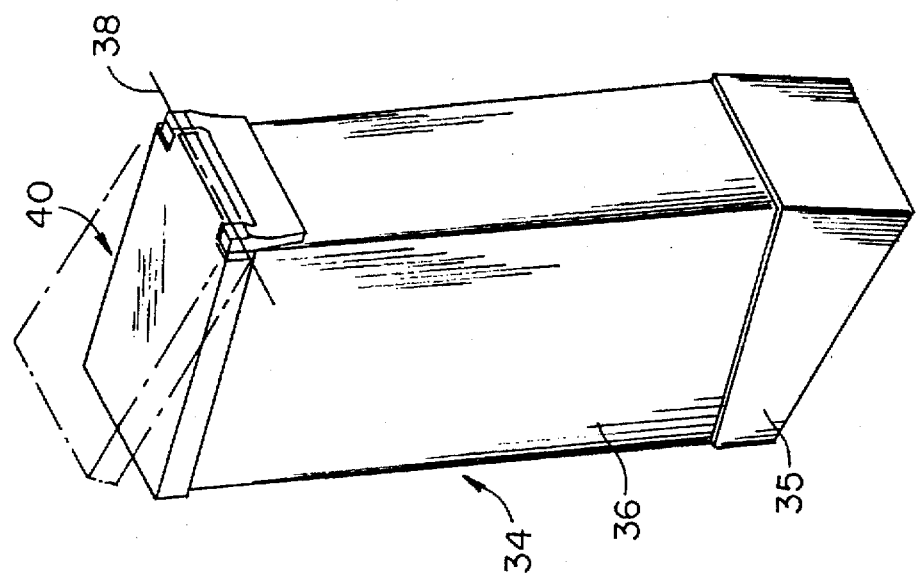
FIG. 5 is a similar perspective view of the operations-control device not ready to employ.
Figure 4:
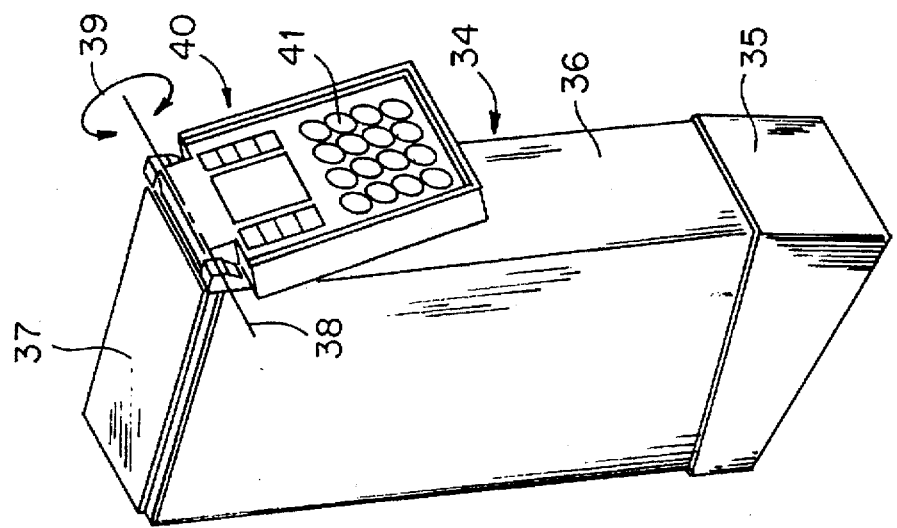
FIG. 4 is a perspective view of the ready-to-employ operations-control device alone along the direction indicated by arrow IV in FIG. 1.
Figure 6:
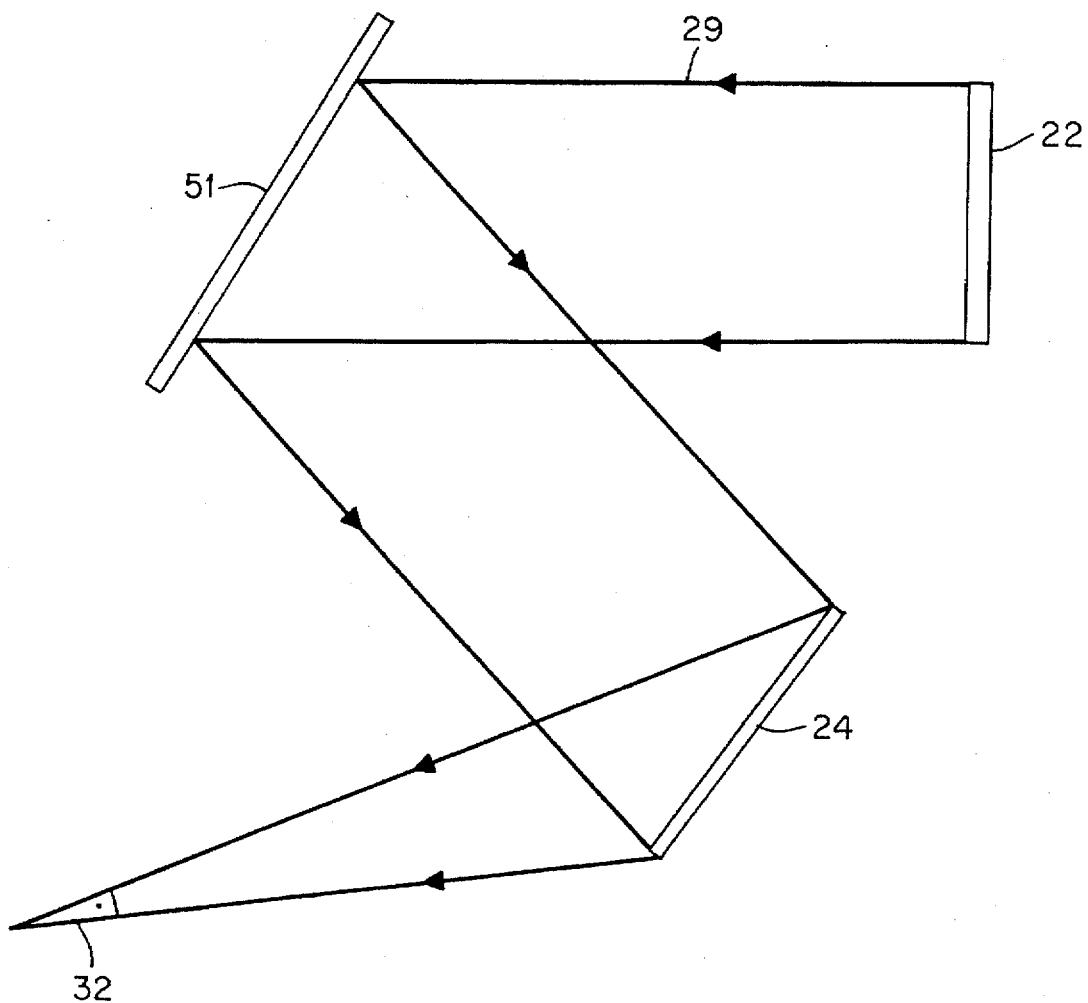
FIG. 6 is a diagrammatic view of another embodiment which includes a mirror positioned at an angle to the beams from the source of light.

The operating unit 34 illustrated alone in perspective in FIGS. 4 and 5 comprises a housing that rests on a rectangular base 35 with an upward-facing inset opening 37 at the top. Swinging in the direction represented by double-headed arrow 39 around an axis 38 on the housing at the edge at one end of opening 37 is a lid 40. Lid 40 covers opening 37 when the unit is not in use as illustrated in FIG. 5 and uncovers it when the unit is in use as illustrated in FIG. 4.

Operating unit 34 extends as will be particularly evident from FIG. 1 out of the console on the right side of the cushion 14 on seat 13 and is accordingly immediately adjacent to joystick 18. An operator sitting in the seat can display desired information in the display 22 on monitor 21 and hence on screen 24 by actuating the buttons 41 on control panel 40 with the hand that holds the joystick without leaving his seat and often without removing his hand from the joystick once panel 40 has been swung into operating position as illustrated in FIG. 4.

In a further embodiment of the present invention, the transparency of the screen 24 may be varied with a manually or mechanically handled filter 50.

In a still further embodiment, the displayed information can be projected onto the screen 24 by way of at least one mirror 51 positioned at an angle to the beams 29.

I claim:

1. A cab for accommodating an operator of a vehicle or machine, comprising: a seat for the operator; an operating-information display system with display instruments in the seated operator's field of vision; at least one multiple-function operations-control means directly within reach of the operator; said information-display system having a monitor with a liquid-crystal display and a projection screen remote from said liquid-crystal display, said projection screen pivoting around a first axis and tilting around a second axis within the operator's field of vision; and a source of light within the monitor and spaced from said liquid-crystal display for projecting displayed information onto said screen.

2. A cab as defined in claim 1, wherein said projection screen is at least semitransparent.

3. A cab as defined in claim 2, wherein said screen is antiglare.

4. A cab as defined in claim 3, wherein said screen has a variable transparency.

5. A cab as defined in claim 4, wherein said screen has a transparency varying automatically in accordance with incident sunlight.

6. A cab as defined in claim 4, including a manually handled filter for varying transparency of said screen.

7. A cab as defined in claim 4, including a mechanically handled filter for varying transparency of said screen.

8. A cab as defined in claim 1, wherein information from said liquid-crystal display is projected onto said screen with parallel beams.

9. A cab as defined in claim 1, wherein said screen is positioned directly in a path of beams emitted by said source of light and traveling through said liquid-crystal display.

10. A cab as defined in claim 1, including at least one mirror positioned at an angle to beams emitted by said source of light for projecting said displayed information onto said screen.

11. A cab as defined in claim 1, including-first means to pivot said screen around said first axis, and second means to tilt said screen around said second axis.

* * * * *